US007497347B2

(12) United States Patent
Norris, Jr.

(10) Patent No.: US 7,497,347 B2
(45) Date of Patent: Mar. 3, 2009

(54) STORAGE UNIT FOR BEING PORTABLE, TOWABLE, LIFTABLE, RACKABLE, AND WEATHERPROOF

(76) Inventor: William G. Norris, Jr., 13611 McQueen's Ct., Jacksonville, FL (US) 32225

( * ) Notice: Subject to any disclaimer, the term of this patent is extended or adjusted under 35 U.S.C. 154(b) by 685 days.

(21) Appl. No.: 11/155,074

(22) Filed: Jun. 16, 2005

(65) Prior Publication Data

US 2006/0045682 A1   Mar. 2, 2006

Related U.S. Application Data

(63) Continuation-in-part of application No. 10/910,732, filed on Aug. 3, 2004.

(51) Int. Cl.
*B65D 88/00* (2006.01)
(52) U.S. Cl. .................... 220/1.5; 206/512
(58) Field of Classification Search .............. 220/1.5, 220/651, 652; 206/503, 509, 512
See application file for complete search history.

(56) References Cited

U.S. PATENT DOCUMENTS

| | | | |
|---|---|---|---|
| 3,499,694 A * | 3/1970 | Coppell | 312/35 |
| 4,652,042 A * | 3/1987 | Bader | 296/186.4 |
| 4,809,851 A * | 3/1989 | Oestreich et al. | 206/599 |
| 4,940,252 A * | 7/1990 | Seib | 280/418.1 |
| 5,230,434 A * | 7/1993 | Patrick et al. | 220/1.5 |
| 5,479,753 A * | 1/1996 | Williams | 52/741.4 |
| 5,501,043 A * | 3/1996 | Park | 52/92.1 |
| 5,511,908 A * | 4/1996 | Van Valkenburgh et al. | 405/129.55 |
| 5,778,604 A * | 7/1998 | Snow | 52/66 |
| 5,779,077 A * | 7/1998 | Fossey | 220/1.5 |
| 5,816,423 A * | 10/1998 | Fenton et al. | 220/1.5 |
| 5,928,735 A * | 7/1999 | Padmanabhan et al. | 428/33 |
| 2002/0170238 A1 * | 11/2002 | Fecko et al. | 52/17 |
| 2004/0188433 A1 * | 9/2004 | Morales et al. | 220/1.5 |

* cited by examiner

*Primary Examiner*—Anthony D Stashick
*Assistant Examiner*—Harry A Grosso
(74) *Attorney, Agent, or Firm*—Charles E. Baxley

(57) ABSTRACT

An improved storage unit of the type having an interior surface, an exterior surface, a floor, a pair of side walls, a front wall, a rear wall, and a roof. The roof is translucent, attaches without any puncturing thereto, and has overhanging eaves and bows with centers that are bowed thereat. A ventilation system allows the storage unit to benefit from storing in a climate controlled warehouse and provides airflow when the storage unit is stored outside. The rear wall has a roll-up door. The pair of side walls, the front wall, and the rear wall are attached from the exterior surface and the interior surface is smooth and non-abrasive. The floor is plastic undercoated plywood. Towing brackets front and rear provide a safe, strong, and secure method to attach a winch system of a transport system for maneuvering the storage unit on and off the transport system and to maneuver the storage unit with forklifts or pallet jacks in a yard or warehouse. Butyl tape seals the roof and all connecting panels and structures.

19 Claims, 9 Drawing Sheets

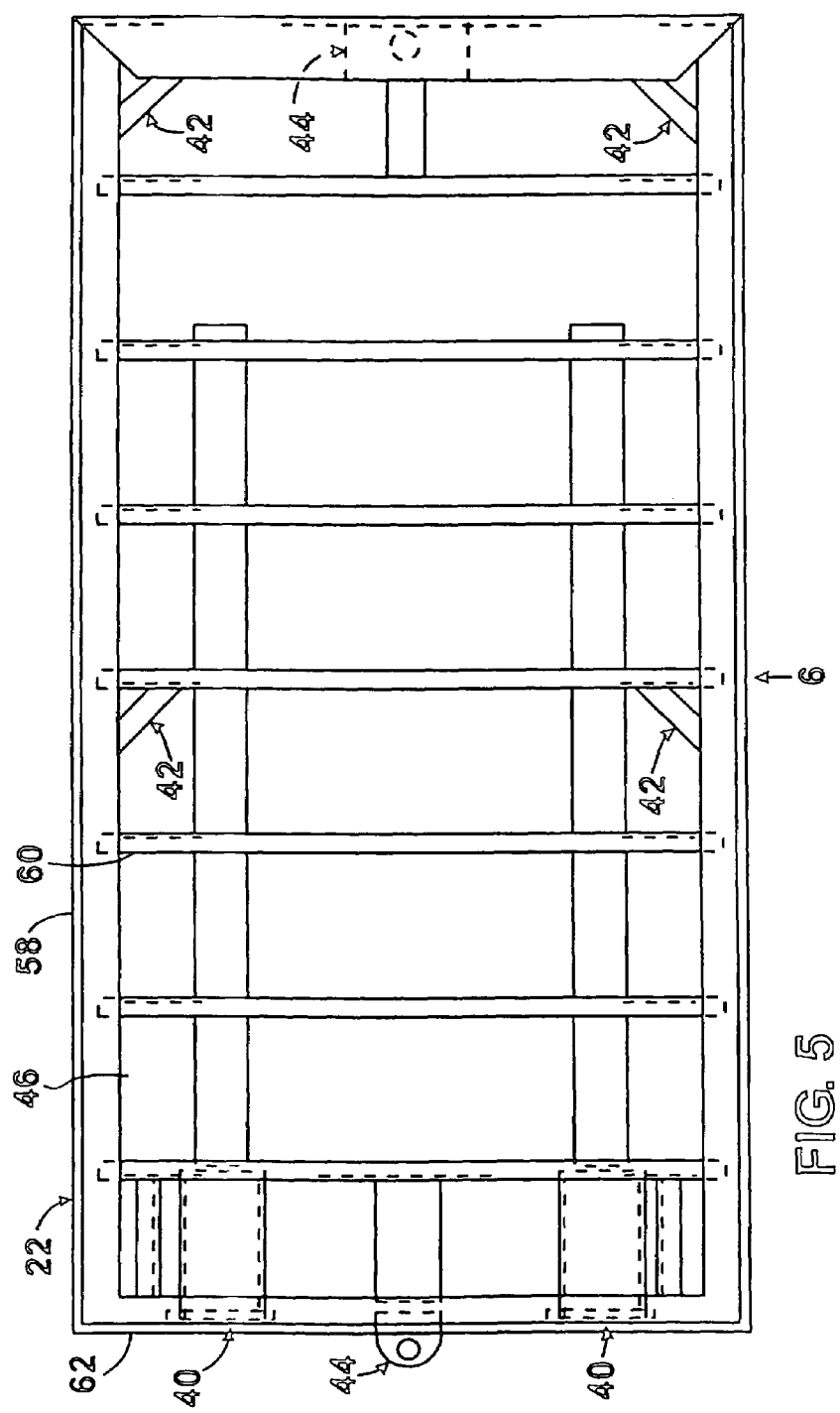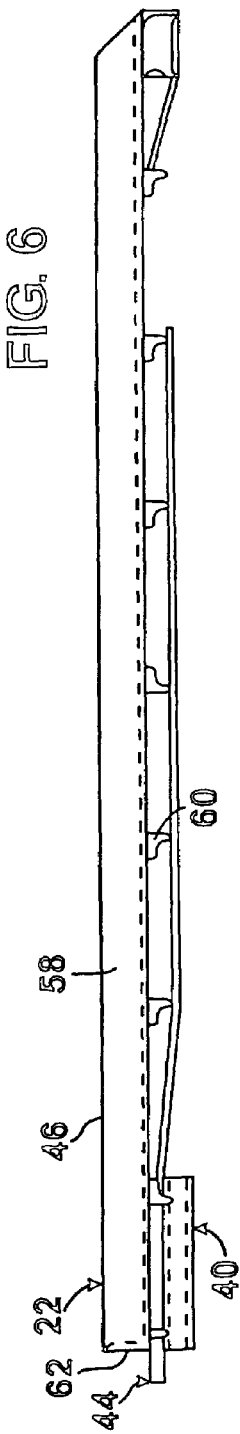

STORAGE UNIT FOR BEING PORTABLE, TOWABLE, LIFTABLE, RACKABLE, AND WEATHERPROOF

CROSS REFERENCE TO RELATED APPLICATIONS

The instant application is a Continuation-In-Part application of application Ser. No. 10/910,732, filed Aug. 3, 2004, and entitled STORAGE UNIT FOR BEING PORTABLE, TOWABLE, LIFTABLE, RACKABLE, AND WEATHERPROOF.

BACKGROUND OF THE INVENTION

1. Field of the Invention

The present invention relates to a storage unit, and more particularly, the present invention relates to a storage unit for being portable, towable, liftable, rackable, and weatherproof.

2. Description of the Prior Art

Due to the cost associated with shipping goods not only locally but long distance, including internationally, and due to the need to standardize the manner in which freight is warehoused or shipped, many goods are transported in large metallic shipping containers. The shipping containers are conventionally loaded and unloaded with respect to a transport vehicle by the use of forklifts or cranes which raise and lower the containers relative to the supporting deck or bed of the transporting vehicle.

It is well known in the cargo container art that for convenience of loading a container and strength of mounting, doors for the container are located and form a rear wall surface of the container in use. The cargo container itself is constructed of a rectangular framework supporting a top, bottom, side walls, and a front wall, and the doors are pivotally mounted on elongate posts located at each corner at the rear of the container to define part of the rear wall. The two opposed rear corner posts extend in a vertical direction and are provided at each of the opposed ends thereof, respectively, with a standard ISO corner casting for attaching the container to lifting equipment or for stacking the container relative to other containers one upon the other. It is usual with such cargo containers to load them with pallets containing the articles to be transported.

Moving into an open position the doors are swung completely outside the door frame opening as defined between the top rail, bottom rail and corner posts interconnecting the top and bottom rails. Each door has a seal around its outermost edge. Shipping systems have been developed which allow shipping containers to be unloaded from the transporting vehicle at a point of delivery or at a point of loading until the container is ready for further shipment.

Numerous innovations for storage unit and related devices have been provided in the prior art that will be discussed infra. Even though these innovations may be suitable for the specific individual purposes to which they address, they each differ in structure and/or operation and/or purpose from the present invention.

FOR EXAMPLE, U.S. Patent Publication Number 2003/0089742 to Fons teaches a bin of corrosion-resistant material fitted inside a steel container. The bin is fastened to the container walls. The side walls and the top wall of the bin are substantially identical in shape to those of the steel container. The container is intended for the transport of bulk goods, especially plastics particle material, the contamination of this material by steel particles, which have come loose as a result of corrosion, being prevented.

ANOTHER EXAMPLE, U.S. Pat. No. 3,599,824 to Pneuman teaches a coupling device for interconnecting cargo containers having pairs of spaced oppositely disposed lugs thereon. The coupling device is interengaged with and between the lugs of the containers, and is particularly adapted for rigidly interconnecting a pair of spaced mutually aligned modular USASI/ISO or similar cargo containers having standard hallow slotted fittings in the opposing corners thereof, in which case such device is interposed between each pair of opposing corner fittings and interengaged with and between opposing edge portions of the slotted end openings in the fittings.

STILL ANOTHER EXAMPLE, U.S. Pat. No. 3,718,218 to Shields teaches a horizontal connection between at least two adjacent stacks of vertically stacked cargo containers having means between the containers in each stack positioning, aligning and interlocking such containers. A horizontal stack interlock member is disposed on top of at least one container in each stack at like stack elevations and is releasably secured to its supporting container. The interlocking member is rotatable about a vertical axis through a limited arc and includes at least one protrusion for horizontal alignment with the protrusion in the interlocking member on the adjacent container stack. A rigid toothed rack between the two members engages the protrusions and thereby horizontally interlocks the containers in the adjacent stacks. By rotating the interlocking members through the vertical axes, the toothed rack can be released from the protrusions to break the connection between the stacks.

YET ANOTHER EXAMPLE, U.S. Pat. No. 3,737,061 to Glumac teaches a truck trailer body having liftable features and a removable storage unit for transport thereby.

STILL YET ANOTHER EXAMPLE, U.S. Pat. No. 4,101,144 to Ross et al. teaches a trailer having a rear central guide post and primary rear load carrying wheels which can be elevated to transfer ground contact to caster wheels and lower the trailer bed so that the trailer can be readily maneuvered while the trailer is backed on the caster wheels to assist in properly aligning the trailer beneath a leg-mounted pallet frame for containers having a center guide slot for receiving the guide post, whereupon the primary wheels are lowered to lift the pallet frame free of the ground for transport on the trailer.

YET STILL ANOTHER EXAMPLE, U.S. Pat. No. 4,266,900 to Rynyk teaches a material handling apparatus, for example, for delivering bags of garbage to an incinerator. The apparatus includes a plurality of material-receiving compartments, each having a first end at which material can be loaded into the compartment, and a second end from which material can be discharged. Each compartment includes a belt conveyor which forms a bottom wall of the compartment and which is operable to move material longitudinally of the compartment in a direction towards said second end. Side walls of the compartment extend upwardly adjacent respective opposite sides of the conveyor for laterally constraining material in the compartment. The compartment also includes closure means normally preventing discharge of material from the second end of the compartment, the closure means being adapted to be opened at appropriate times to allow material to be discharged from the compartment by operating the belt conveyor. The apparatus also includes a further belt conveyor positioned to receive material discharged from the compartments and operable to deliver the material to a common discharge location.

STILL YET ANOTHER EXAMPLE, U.S. Pat. No. 4,747,504 to Wiseman et al. teaches an aircraft cargo container having sides, inboard and outboard ends, a horizontal top and a horizontal bottom. The bottom is rectangular and provided with casters located in corner recesses. The inboard end and both sides of the container are substantially vertical, while the outboard end substantially conforms to the curvature of the aircraft fuselage cabin cross section. The inboard and outboard ends are so sized that the container will freely pass through a standard left side passenger entry door. The sides are so dimensioned that when two containers are located end-to-end with their inboard ends opposed, they will substantially fill the aircraft fuselage cabin cross section with clearance between themselves and between themselves and the aircraft fuselage, so that a plurality of containers can be arranged within the aircraft in two longitudinal rows, the containers of each row having adjacent sides opposed. Each container has a door in one of its sides. The container bottom provides flanges along the container ends cooperating with side guide rails and a center guide rail assembly mounted in the aircraft. The container bottom also provides flanges along the container sides, engageable by fore and aft restraints.

YET STILL ANOTHER EXAMPLE, U.S. Pat. No. 4,875,595 to Van Valkenburg teaches a storage enclosure provided for storing containers of hazardous material with a secondary containment feature being provided by a one piece containment pan cradled within a support base frame work of support beams and side beams which also allow for visual inspection of the underside of the pan. The enclosure is of a very sturdy construction employing relatively heavy gauge steel sheets for side and rear wall panels mounted to panel supporting frames of tubular steel frame members. A pair of front doors are also made of steel panels secured to door frames of tubular steel construction. Footing channel members provide spaces for forklift mobility of the enclosure. The one piece panel roof and associated frame is secured by a friction fit to the enclosure side walls so that it may lift off when elevated internal pressures are experienced.

STILL YET ANOTHER EXAMPLE, U.S. Pat. No. 4,884,722 to Podd teaches a bulkhead for use with a cargo container, and comprising a wall member and at least a first slanted corner member. The wall member holds a cargo in the container, and the corner member is connected to the wall member adjacent a lower corner thereof to guide cargo downwardly and laterally toward an outlet in the wall member. Also disclosed is a lining system for a cargo container, and comprising a flexible liner and a bulkhead to hold the liner in place in the container. The liner includes an inlet and an outlet, and collapsible inlet and outlet chutes are provided to selectively open and close the inlet and outlet of the liner. With one embodiment the lining system is air and water tight; and with an alternate embodiment, the liner allows gases to pass outward through the liner.

YET STILL ANOTHER EXAMPLE, U.S. Pat. No. 6,401,983 to McDonald et al. teaches a bulk cargo container for storing, transporting or processing solid or liquid bulk materials. The bulk cargo container includes a vessel suitable for containing the bulk material and a supporting frame assembly having a generally horizontally disposed support member attachment. In an exemplary embodiment, the vessel is formed of fiber reinforced plastic material and includes a container portion and a support member. The container portion is formed into at least one hopper having a discharge opening therein suitable for discharging bulk material contained within the vessel. The vessel is supported from the support member attachment via the support member so that the weight of the bulk material is carried in tension by the fiber reinforced plastic material of the vessels shell.

STILL YET ANOTHER EXAMPLE, U.S. Pat. No. 6,443,209 to Hurst teaches a roll up door for trucks and the like that comprises a one piece plastic sheet member which encloses the door opening. A plurality of stiffening panels are attached to the sheet member in spaced relation and preferably bonded to the sheet member. Rollers and attached axles are mounted on the panels via bores which receive the axles. The rollers ride in roll up door tracks which capture the rollers and door to the tracks in conventional fashion. The sheet member forms living hinges in the spaces between adjacent panels.

It is apparent that numerous innovations for storage unit and related devices have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

ACCORDINGLY, AN OBJECT of the present invention is to provide a storage unit for being portable, towable, liftable, rackable, and weatherproof that avoids the disadvantages of the prior art.

ANOTHER OBJECT of the present invention is to provide a storage unit for being portable, towable, liftable, rackable, and weatherproof that is simple to use.

BRIEFLY STATED, STILL ANOTHER OBJECT of the present invention is to provide an improved storage unit of the type having an interior, an exterior, a floor, a pair of side walls, a front wall, a rear wall, and a roof. The roof is translucent, attaches without any puncturing thereto, and has overhanging eaves and bows with centers that are bowed thereat. A ventilation system allows the storage unit to benefit from storing in a climate controlled warehouse and provides airflow when the storage unit is stored outside. The rear wall has a roll-up door. The pair of side walls, the front wall, and the rear wall are attached from the exterior and the interior is smooth and non-abrasive. The floor is plastic undercoated plywood. Towing brackets front and rear provide a safe, strong, and secure method to attach a winch system of a transport system for maneuvering the storage unit on and off the transport system and to maneuver the storage unit with forklifts or pallet jacks in a yard or warehouse. Butyl tape seals the roof and all connecting panels and structures.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 5 is a diagrammatic bottom plan view of the floor, the fork pockets, the wheel support system, and the towing brackets of the storage unit of the present invention;

FIG. 6 is a diagrammatic side elevational view taken generally in the direction of ARROW 6 in FIG. 5;

Figure 1:
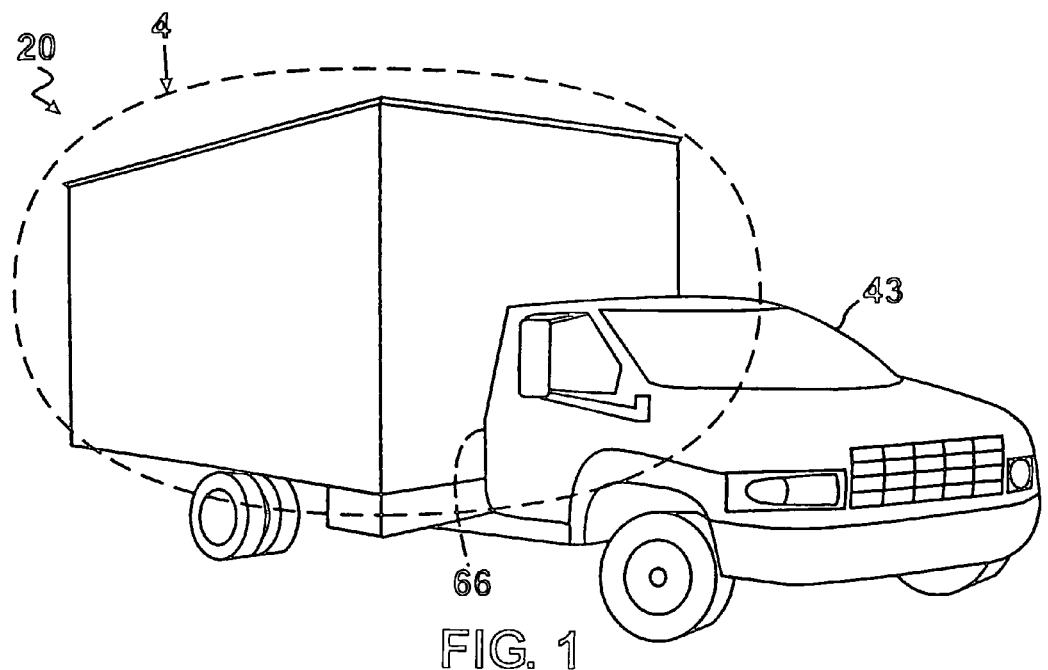
FIG. 1 is a diagrammatic perspective view of the storage unit of the present invention being towed on a truck.

LIST OF REFERENCE NUMERALS UTILIZED IN THE DRAWINGS 20 storage unit of present invention for being portable, towable, liftable, rackable, and weatherproof
22 floor
24 pair of side walls
26 front wall
28 rear wall
30 roof
32 interior surface
34 exterior surface
36 door of rear wall 28
38 ventilation system for allowing storage unit 20 to benefit from being stored in climate controlled warehouse and for providing airflow when storage unit 20 is stored outside thereby reducing moisture and humidity and thereby effectively preventing mold and mildew
40 fork pockets for providing safe lifting method using fork lifts to lift and maneuver storage unit 20 from end 62 of storage unit 20 and rack
42 wheel support system of floor 22 for providing added strength and safety while maneuvering storage unit 20 and loading and unloading storage unit 20 to and from transport system 43
43 transport system
44 towing brackets for providing a safe, strong, and secure method to attach transport winch system 66 for maneuvering storage unit 20 on and off transport system 43 and for providing safe, strong, and secure method to maneuver storage unit 20 with forklifts or pallet jacks in yard or warehouse.
46 frame
47 caster wheels for creating portability both for maneuvering in yards, driveways, or warehouses, and for loading and unloading on and off transport system 43 and for elevating storage unit 20 above ground level sufficiently to prevent ground moisture effects
48 railing system for allowing for tie downs and hanging clothes
49 brakes for lifting storage unit 20 to prevent caster wheels 47 from rolling thereby effectively holding storage unit 20 in place
50 contents
52 heat and moisture resistant marine-grade paint
54 door frame of door 36 of rear wall 28
56 plastic undercoated plywood of floor 22 for preventing ground water dampness and for keeping storage unit 20 dry during hauling on transport system 43
58 sealed surfaces of floor 22 for preventing moisture absorption
60 welded floor support system of floor 22 for providing extreme strength and load capacity to enable storage unit 20 to handle unusually high tonnage strength
62 end of storage unit 20
66 transport winch system of transport system 43
68 tubed wall studs of frame 46
70 overhanging eaves of roof 30 for adding protection from weather
72 roof bows of roof 30
74 center of roof bows 72 of roof 30
76 corners of frame 46 of roof 30
78 plurality of lateral cross braces of frame 46 of roof 30 for lateral strength
80 corner studs of frame 46
82 plurality of bracing studs of frame 46
86 plurality of reinforcement plates of frame 46 for reinforcement,
88 interior surfaces of corner studs 80 of frame 46
90 fork pockets of frame 46 for providing safety and support for lift forks when lifting and maneuvering storage unit 20 from side 92
92 side of storage unit 20
94 plurality of stacking pockets for holding caster wheels 47 of above-stacked storage unit 20
96 corners of roof 30
98 flat bars of each stacking pocket of plurality of stacking pockets 94
100 plate of each stacking pocket of plurality of stacking pockets 94
102 bolts of each stacking pocket of plurality of stacking pockets 94
104 washers of each stacking pocket of plurality of stacking pockets 94
106 nuts of each stacking pocket of plurality of stacking pockets 94

DETAILED DESCRIPTION OF THE INVENTION

Figure 2:
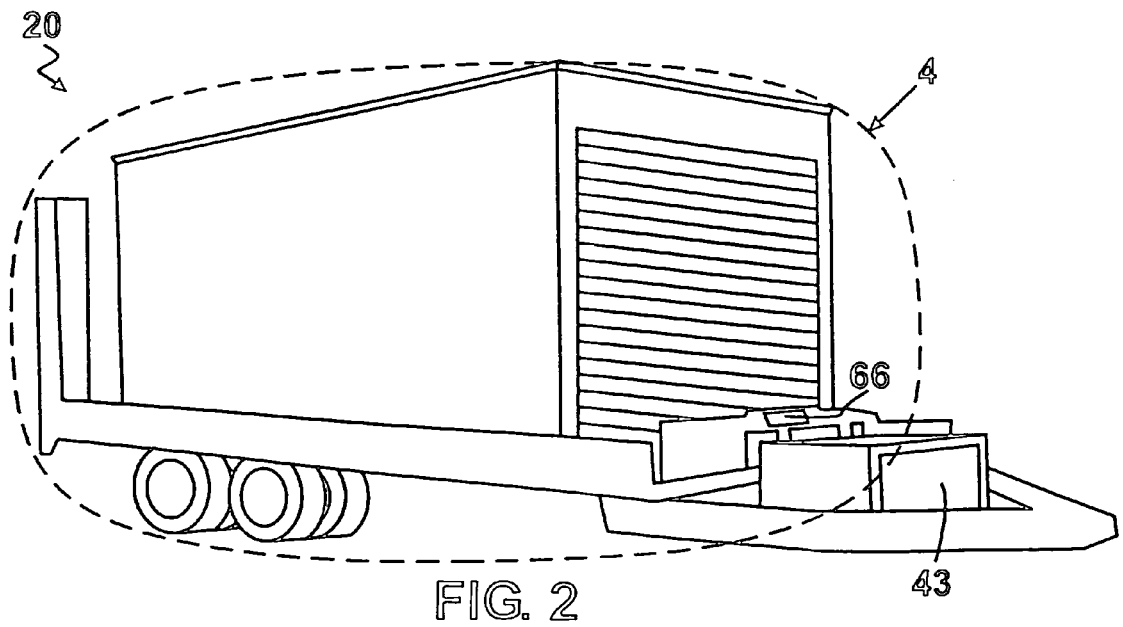
FIG. 2 is a diagrammatic perspective view of the storage unit of the present invention being towed on a trailer.
Figure 3:
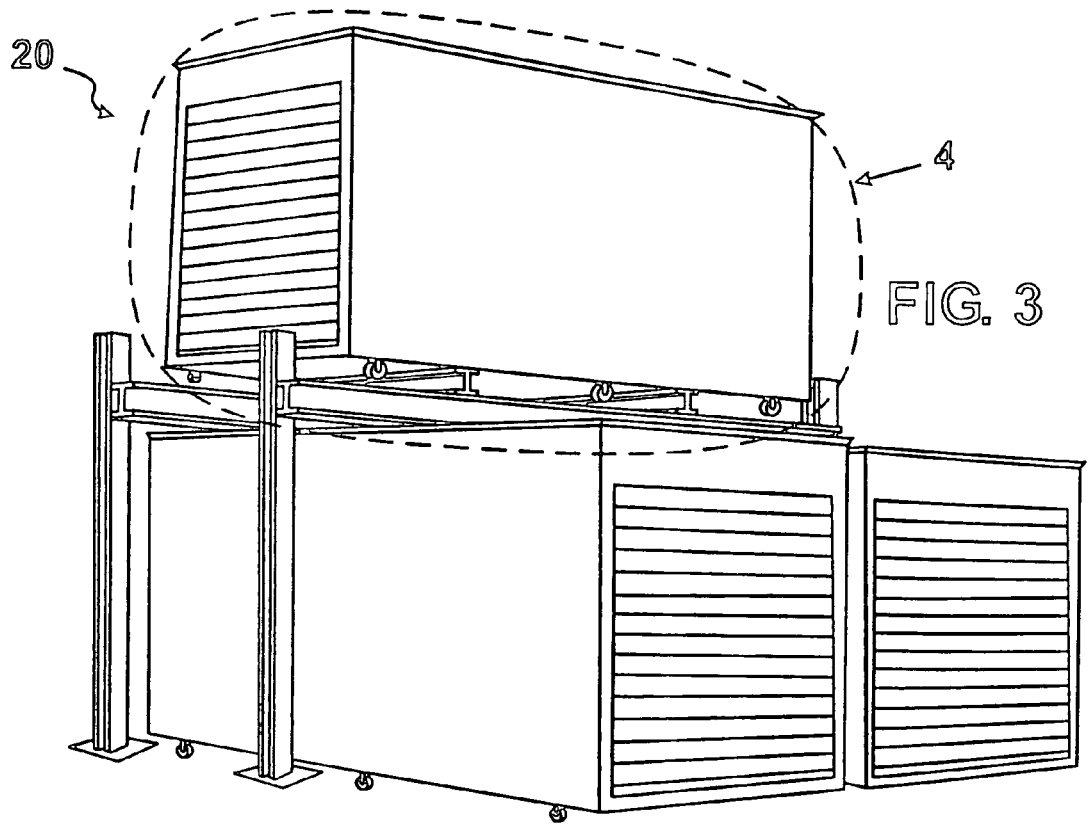
FIG. 3 is a diagrammatic perspective view of the storage unit of the present invention being racked.

Referring now to the figures, in which like numerals indicate like parts, and particularly to FIGS. 1-3, which are respectively, a diagrammatic perspective view of the storage unit of the present invention being towed on a truck, a diagrammatic perspective view of the storage unit of the present invention being towed on a trailer, and a diagrammatic perspective view of the storage unit of the present invention being racked, the storage unit of the present invention is shown generally at 20 for being portable (FIGS. 1-3), towable (FIGS. 1 and 2), liftable, rackable (FIG. 3), and weatherproof.

Figure 4:
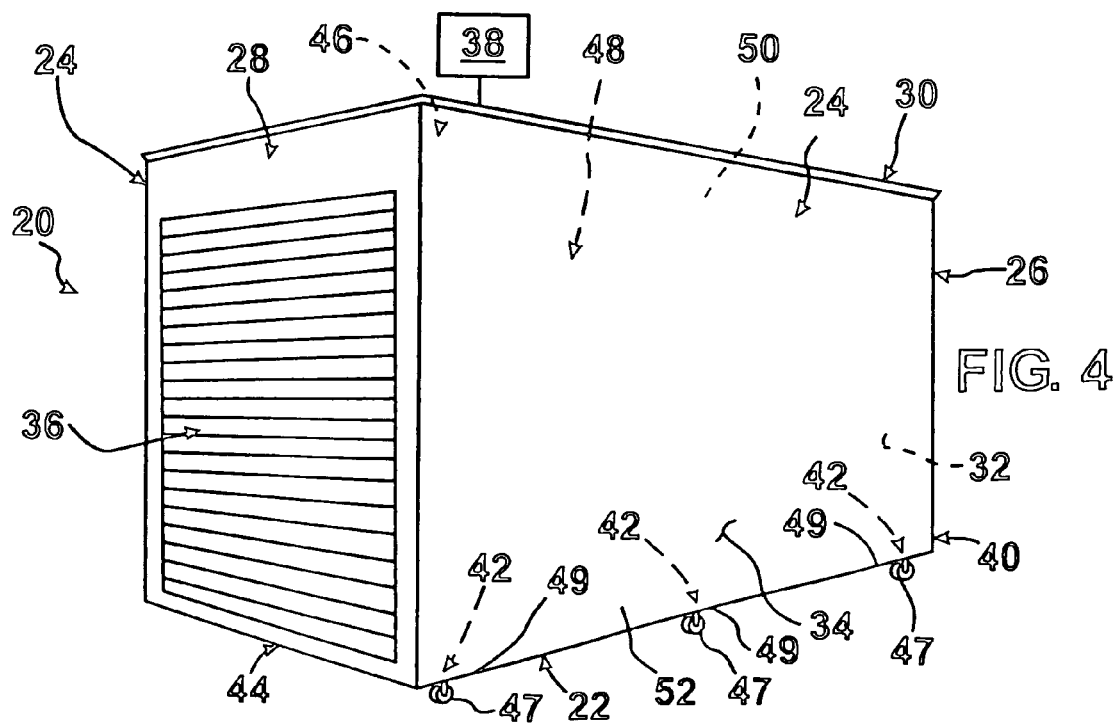
FIG. 4 is a diagrammatic perspective view of the area generally enclosed by the dotted curve identified by ARROW 4 in FIGS. 1-3 of the storage unit of the present invention.

The overall configuration of the storage unit 20 can best be seen in FIG. 4, which is a diagrammatic perspective view of the area generally enclosed by the dotted curve identified by ARROW 4 in FIGS. 1-3 of the storage unit of the present invention, and as such, will be discussed with reference thereto.

The storage unit 20 has a floor 22, a pair of side walls 24, a front wall 26, a rear wall 28, a roof 30, an interior surface 32, an exterior surface 34, a door 36, a ventilation system 38, fork pockets 40, a wheel support system 42, towing brackets 44, a frame 46, caster wheels 47, a railing system 48, and brakes 49.

The pair of side walls 24, the front wall 26, and the rear wall 28 are made of steel for being strong and secure and are galvanized for providing unusually strong walls that will not dampen or sweat even in severe hot or cold weather conditions.

The interior surface 32 is smooth and non-abrasive for preventing damaging of contents 50 by rough edges or surfaces and is attached from the exterior surface 34 for eliminating exposed fasteners on the interior surface 32. The exterior surface 34 is coated with heat and moisture resistant marine-grade paint 52.

The door 36 is a part of the rear wall 28 and is a steel roll-up door for preventing the contents 50 of the storage unit 20 from interfering with door operation. The door 36 of the rear wall 28 is lockable, secure, and has a door frame 54 that is secured in place by welding.

The ventilation system 38 is operatively connected to the exterior surface 34 and is for allowing the storage unit 20 to benefit from being stored in a climate controlled warehouse and for providing airflow when the storage unit 20 is stored outside thereby reducing moisture and humidity and thereby effectively preventing mold and mildew.

The specific configuration of the floor 22, the fork pockets 40, the wheel support system 42, and the towing brackets 44 can best be seen in FIGS. 5 and 6, which are, respectively, a diagrammatic bottom plan view of the floor, the fork pockets, the wheel support system, and the towing brackets of the storage unit of the present invention and a diagrammatic side elevational view taken generally in the direction of ARROW 6 in FIG. 5, and as such, will be discussed with reference thereto.

The floor 22 is made of plastic undercoated plywood 56 for preventing ground water dampness and for keeping the storage unit 20 dry during hauling on the transport system 43. The floor 22 has sealed surfaces 58 for preventing moisture absorption and a welded floor support system 60 for providing extreme strength and load capacity to enable the storage unit 20 to handle unusually high tonnage strength.

The fork pockets 40 depend from the floor 22 and are for providing a safe lifting method using fork lifts to lift and maneuver the storage unit 20 from an end 62 thereof and rack. The storage unit 20 is rackable up to three high.

The wheel support system 42 is a part of the floor 22 and is for providing added strength and safety while maneuvering the storage unit 20 and loading and unloading the storage unit 20 to and from a transport system 43 (FIGS. 1 and 2).

The towing brackets 44 extend from the floor 22, front and rear, are for providing a safe, strong, and secure method to attach a transport winch system 66 (FIGS. 1 and 2) for maneuvering the storage unit 20 on and off the transport system 43 (FIGS. 1 and 2). The towing brackets 44 are for further providing a safe, strong, and secure method to maneuver the storage unit 20 with forklifts or pallet jacks in a yard or warehouse.

Figure 7:
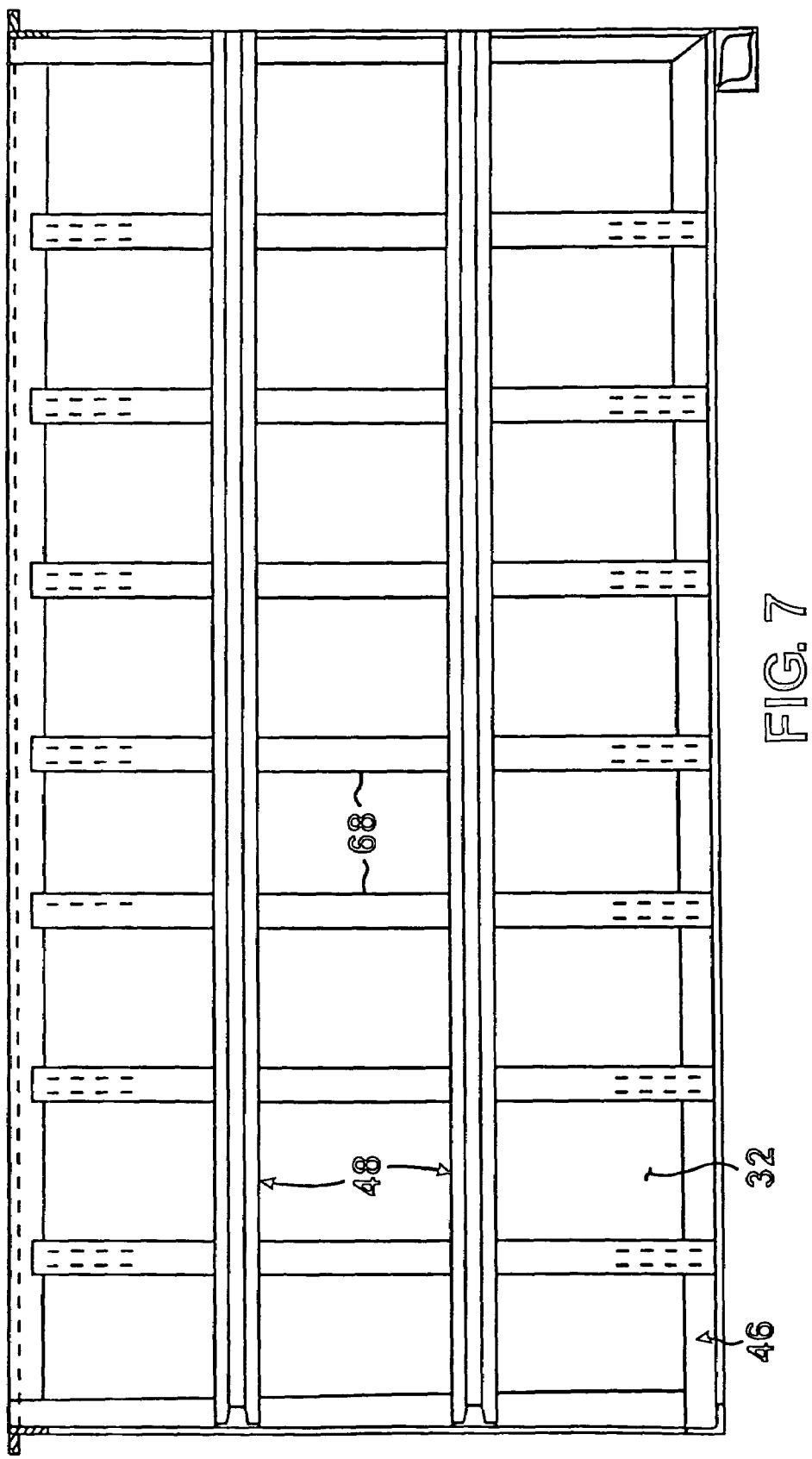
FIG. 7 is a diagrammatic side elevational view of the frame and the railing system of the storage unit of the present invention.

The specific configuration of the frame 46 and the railing system 48 can best be seen in FIG. 7, which is a diagrammatic side elevational view of the frame and the railing system of the storage unit of the present invention, and as such, will be discussed with reference thereto.

The frame 46 includes the floor 22, the pair of side walls 24, the front wall 26, and the rear wall 28. The frame 46 is welded for providing unusual lateral and vertical strength uncommon in portable or non-portable storage units and is steel coated to prevent rust. The frame 46 allows for portability, towabilty, liftability, and rackability, and has long life with easy repair. The frame 46 has tubed wall studs 68 that provide a sturdy wall attachment system.

The railing system 48 is disposed in the interior surface 32. The railing system 48 is sturdy and is for allowing for tie downs and hanging clothes.

Figure 8:
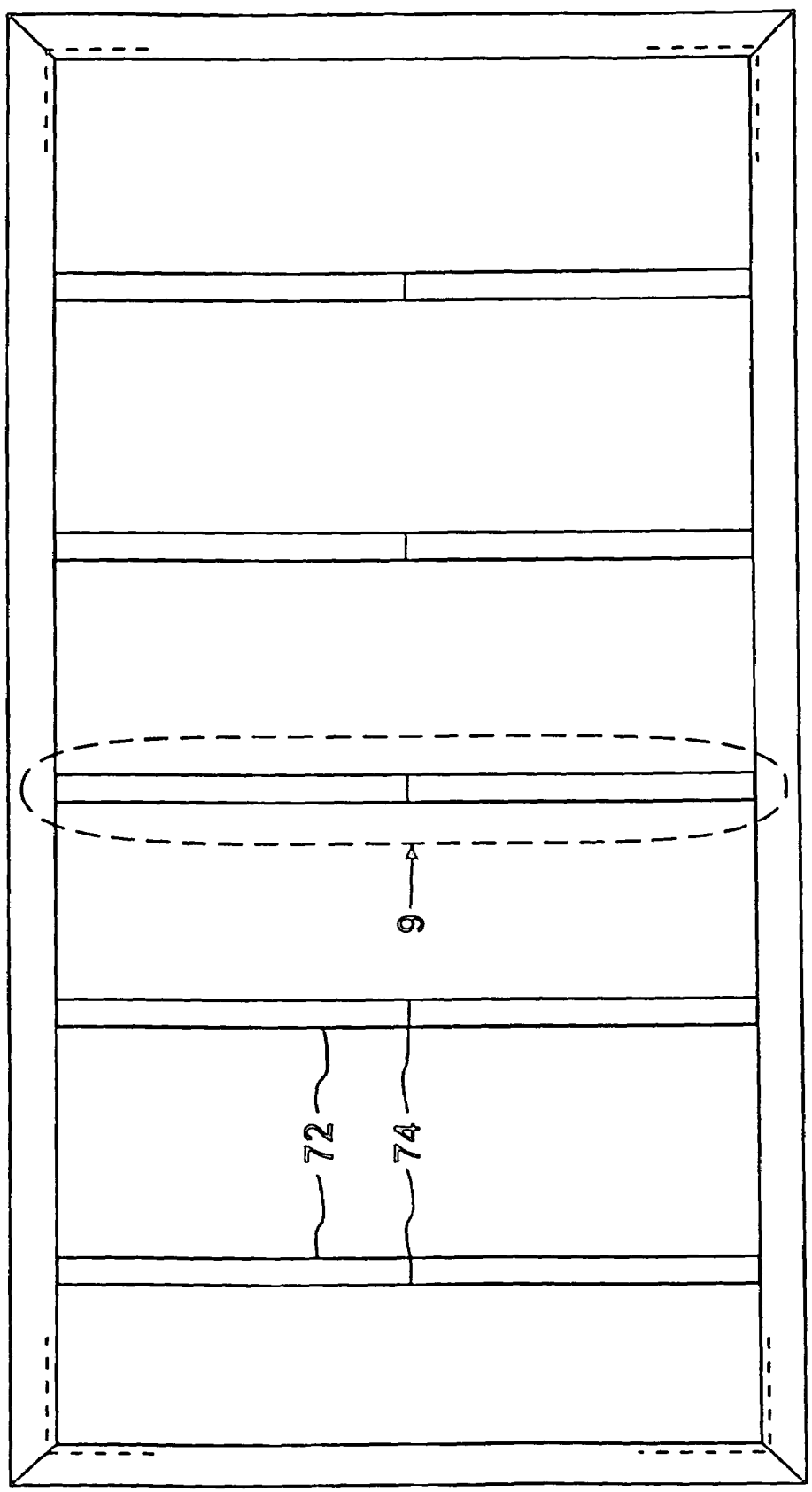
FIG. 8 is a diagrammatic bottom plan view of the roof of the storage unit of the present invention.
Figure 9:
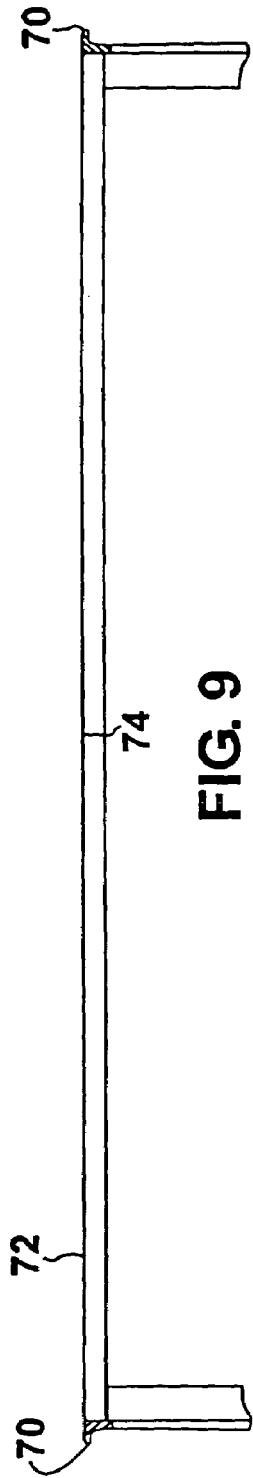
FIG. 9 is an enlarged diagrammatic front elevational view of the area generally enclosed by the dotted curve identified by ARROW 9 in FIG. 8 of a bow of the roof of the storage unit of the present invention.

The specific configuration of the roof 30 can best be seen in FIGS. 8 and 9, which are, respectively, a diagrammatic bottom plan view of the roof of the storage unit of the present invention and an enlarged diagrammatic front elevational view of the area generally enclosed by the dotted curve identified by ARROW 9 in FIG. 8 of a bow of the roof of the storage unit of the present invention, and as such, will be discussed with reference thereto.

The roof 30 has overhanging eaves 70 for adding protection from weather, and roof bows 72. The roof bows 72 of the roof 30 are bowed in the center 74 thereof and welded to the frame 46 to provide for efficient water run-off. The roof 30 is translucent to let in sufficient natural light so that no artificial interior lighting is necessary, is sturdy, is weather tight, and attaches without any puncturing thereto due to the overhanging eaves 70 thereof.

Figure 10:
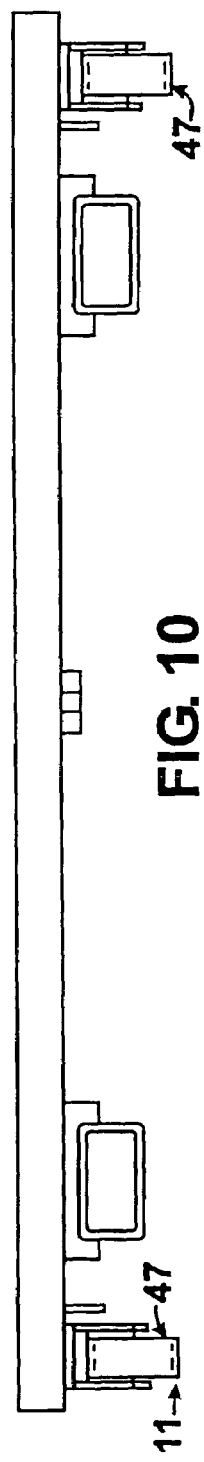
FIG. 10 is a diagrammatic rear elevational view of the caster wheels of the storage unit of the present invention.
Figure 11:
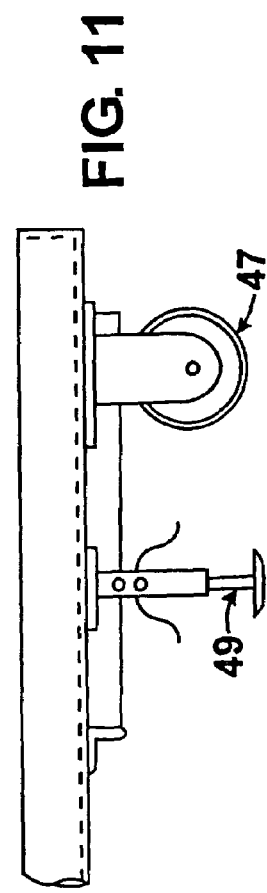
FIG. 11 is a fragmented diagrammatic side elevational view taken generally in the direction of ARROW 11 in FIG. 10 of the caster wheels and the brake of the storage unit of the present invention.

The specific configuration of the caster wheels 47 and the brakes 49 can best be seen in FIGS. 10 and 11, which are, respectively, a diagrammatic rear elevational view of the caster wheels of the storage unit of the present invention and a fragmented diagrammatic side elevational view taken generally in the direction of ARROW 11 in FIG. 10 of the caster wheels and the brake of the storage unit of the present invention, and as such, will be discussed with reference thereto.

The caster wheels 47 depend from the wheel support system 42 and have heavy duty 2,000 lb. capacity. The caster wheels 47 are for creating a portability both for maneuvering in yards, driveways, or warehouses and for loading and unloading on and off the transport system 43 (FIGS. 1 and 2) and for elevating the storage unit 20 above ground level sufficiently to prevent ground moisture effects.

The brakes 49 depend from the floor 22. The brakes 49 are for lifting the storage unit 20 to prevent the caster wheels 47 from rolling thereby effectively holding the storage unit 20 in place.

The storage unit 20 further has butyl tape. The butyl tape seals the roof 30 and all connecting panels and structures for creating a completely dry and waterproof storage unit 20.

Figure 12:
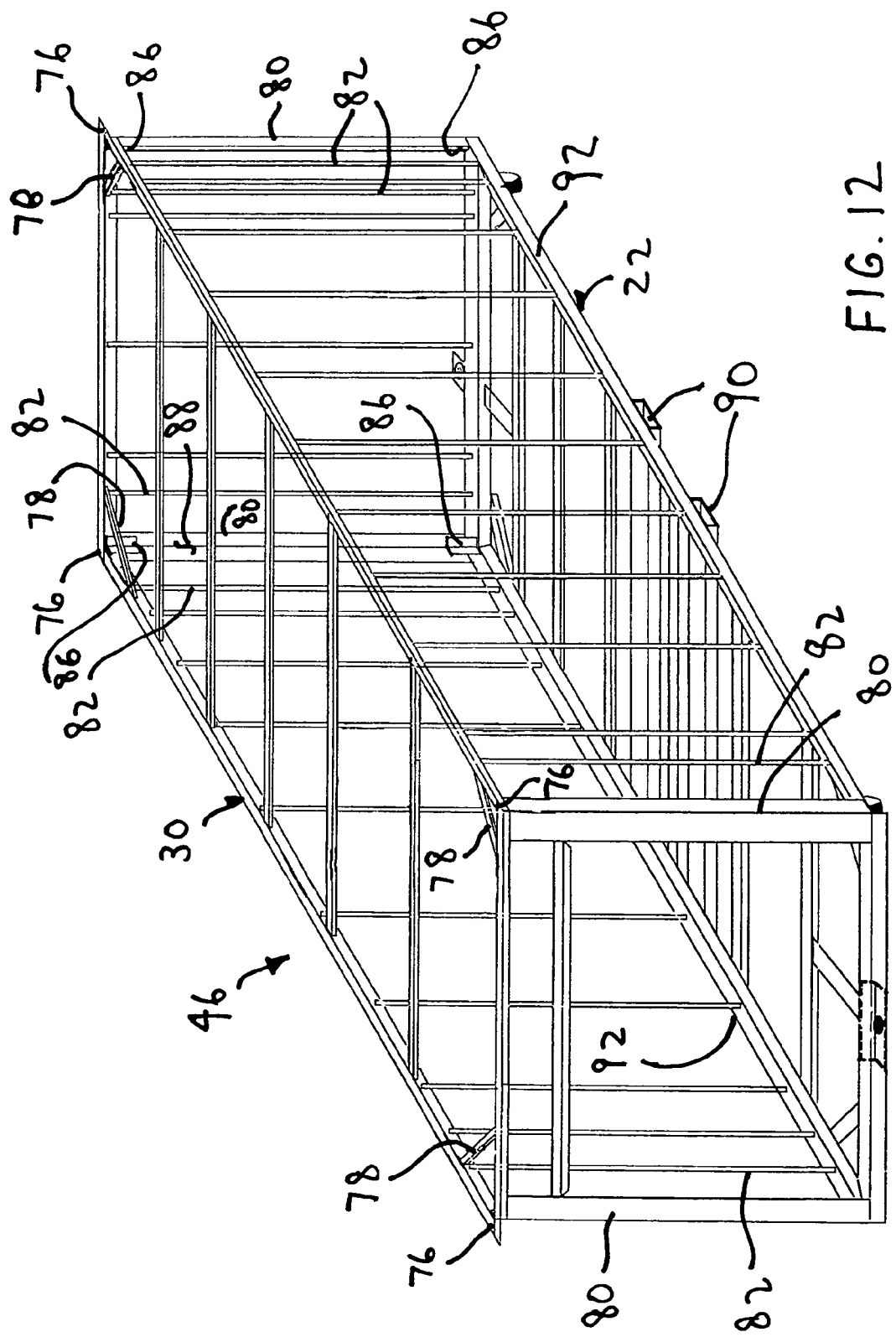
FIG. 12 is a diagrammatic perspective view of the frame of the storage unit of the present invention.

Further details of the frame 46 can best be seen in FIG. 12, which is a diagrammatic perspective view of the frame of the storage unit of the present invention, and as such, will be discussed with reference thereto.

The frame 46 further comprises the frame 46 of the roof 30 having corners 76 and a plurality of lateral cross braces 78. The plurality of lateral cross braces 78 of the frame 46 of the roof 30 extend diagonally across the corners 76 of the frame 46 of the roof 30, respectively, are for lateral strength, and are preferably channels.

The frame 46 further comprises corner studs 80 and a plurality of bracing studs 82. The plurality of bracing studs 82 of the frame 46 extend upwardly, adjacent both sides of the corner studs 80 of the frame 46, respectively, are for vertical strength and support, and are preferably channels.

The frame 46 further comprises a plurality of reinforcement plates 86. The plurality of reinforcement plates 86 of the frame 46 are affixed to interior surfaces 88 of the corner studs 80 of the frame 46, respectively, adjacent the floor 22 and the roof 30, are for reinforcement, and are preferably angles welded to the interior surfaces 88 of the corner studs 80 of the frame 46.

The frame 46 further comprises fork pockets 90. The fork pockets 90 of the frame 46 depend transversely from the floor 22, are for providing safety and support for lift forks when lifting and maneuvering the storage unit 20 from a side 92, and are preferably steel tubing.

Figure 13:
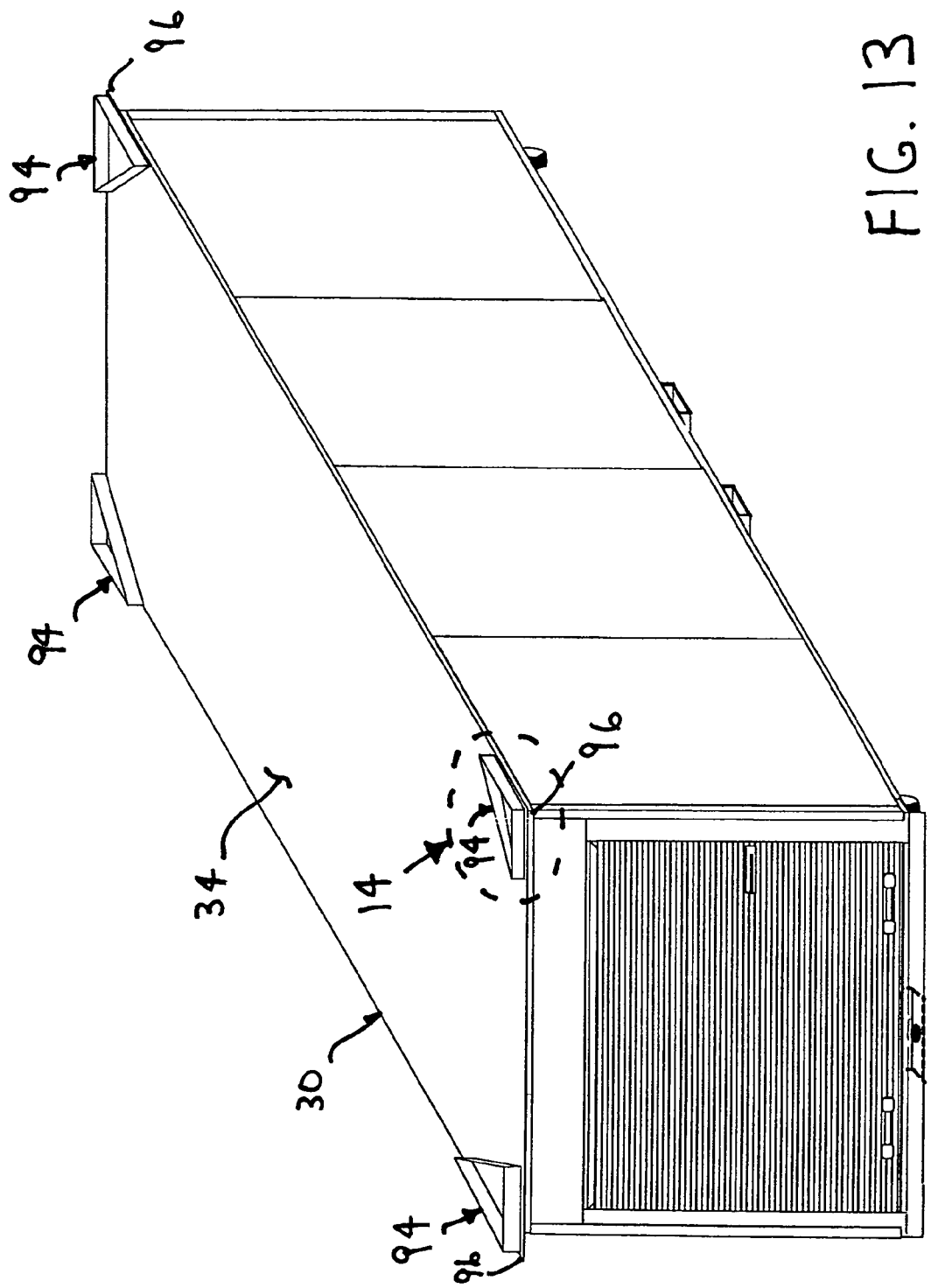
FIG. 13 is a diagrammatic perspective view of the storage unit of the present invention with stacking pockets thereon.

As shown in FIG. 13, which is a diagrammatic perspective view of the storage unit of the present invention with stacking pockets thereon, the storage unit further comprises a plurality of stacking pockets 94.

The plurality of stacking pockets 94 are disposed on the exterior surface 34 of the roof 30, at corners 96 of the roof 30, respectively, and are for holding the caster wheels 47 of an above-stacked storage unit 20.

Figure 14:
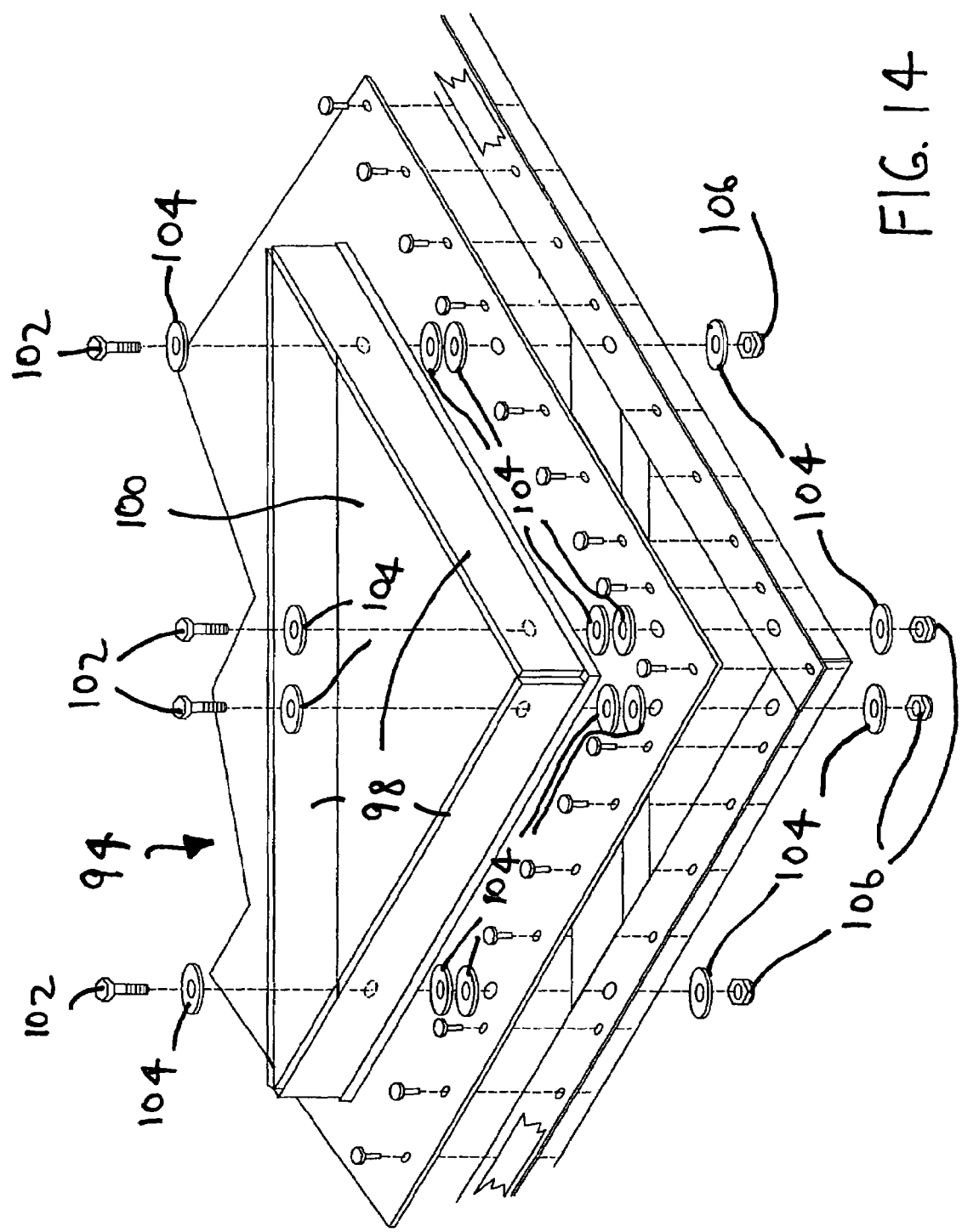
FIG. 14 is an enlarged exploded perspective view of the area generally enclosed by the dotted circle identified by ARROW 14 in FIG. 13 of a stacking pocket of the storage unit of the present invention.

The specific configuration of each stacking pocket 94 can best be seen in FIG. 14, which is an enlarged exploded perspective view of the area generally enclosed by the dotted circle identified by ARROW 14 in FIG. 13 of a stacking plate of the storage unit of the present invention, and as such, will be discussed with reference thereto.

Each stacking pocket 94 comprises flat bars 98 and a plate 100. The plate 100 of the stacking pocket 94 is triangular-shaped and the flat bars 98 of the stacking pocket 94 are disposed in a triangular configuration and are attached to the plate 100 of the stacking pocket 94 so as to form the stacking pocket 94. The stacking pocket 94 is attached to the roof 30 preferably by bolts 102, washers 104, and nuts 106.

It will be understood that each of the elements described above, or two or more together, may also find a useful application in other types of constructions differing from the types described above.

While the invention has been illustrated and described as embodied in a storage unit for being portable, towable, liftable, rackable, and weatherproof, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An improved storage unit of the type having an interior surface, an exterior surface, a floor, a pair of side walls, a front wall, a rear wall, and a roof, said improvement comprising:
   the roof being translucent for letting in sufficient light so that no artificial interior surface lighting is necessary;
   wherein said improvement further comprises a plurality of stacking pockets disposed on corners of the exterior surface of the roof, respectively, for holding caster wheels of an above-stacked storage unit;
   wherein said improvement further comprises each stacking pocket comprising flat bars and a plate, and said flat bars of said stacking pocket being attached to said plate of said stacking pocket so as to form said stacking pocket; and
   wherein said improvement further comprises each stacking pocket comprising said plate of said stacking pocket being triangular-shaped and said flat bars of said stacking pocket being disposed in a triangular configuration.

2. The improved storage unit as defined in claim 1, wherein said improvement further comprises the roof attaching without any puncturing thereto for preventing leaks therethrough.

3. The improved storage unit as defined in claim 1, wherein said improvement further comprises the roof having overhanging eaves for adding protection from weather.

4. The improved storage unit as defined in claim 1, wherein said improvement further comprises a ventilation system for allowing the storage unit to benefit from being stored in a climate controlled warehouse and for providing airflow when the storage unit is stored outside thereby reducing moisture and humidity and thereby effectively preventing mold and mildew.

5. The improved storage unit as defined in claim 1, wherein said improvement further comprises the rear wall having a roll-up door for preventing contents from interfering with door operation.

6. The improved storage unit as defined in claim 1, wherein said improvement further comprises the interior surface being smooth and non-abrasive for preventing damage to contents by rough edges or surfaces.

7. The improved storage unit as defined in claim 1, wherein said improvement further comprises the floor being plastic undercoated plywood for preventing ground water dampness and for keeping the storage unit dry during hauling on a transport system.

8. The improved storage unit as defined in claim 1, wherein said improvement further comprises towing brackets front and rear for providing a safe, strong, and secure method to attach a winch system of a transport system for maneuvering the storage unit on and off the transport system and for providing a safe, strong, and secure method to maneuver the storage unit with forklifts or pallet jacks in a yard or warehouse.

9. The improved storage unit as defined in claim 1, wherein said improvement further comprises butyl tape sealing the roof and all connecting panels and structures for creating a completely dry and waterproof storage unit.

10. The improved storage unit of claim 1, wherein the improved storage unit is further of the type having a frame;
   wherein said improvement further comprises the frame of the roof having a plurality of lateral cross braces extending diagonally across corners of the frame of the roof, respectively, for lateral strength.

11. The improved storage unit of claim 10, wherein said improvement further comprises said plurality of lateral cross braces of the frame being channels.

12. The improved storage unit of claim 10, wherein said improvement further comprises the frame further comprising corner studs and a plurality of bracing studs that extend upwardly, adjacent both sides of said corner studs of the frame, respectively, for vertical strength and support.

13. The improved storage unit of claim 12, wherein said improvement further comprises said plurality of bracing studs of the frame being channels.

14. The improved storage unit of claim 12, wherein said improvement further comprises the frame further comprising a plurality of reinforcement plates affixed to said corner studs of the frame, respectively, for reinforcement.

15. The improved storage unit of claim 14, wherein said improvement further comprises said plurality of reinforcement plates of the frame being affixed to interior surfaces of said corner studs of the frame, respectively, adjacent the floor and the roof.

16. The improved storage unit of claim 14, wherein said improvement further comprises said plurality of reinforcement plates of the frame being angles.

17. The improved storage unit of claim 10, wherein said improvement further comprises the frame further comprising fork pockets depending transversely from the floor for providing safety and support for lift forks when lifting and maneuvering said storage unit from a side.

18. The improved storage unit of claim 17, wherein said improvement further comprises said fork pockets of the frame being steel tubing.

19. The improved storage unit of claim 1, wherein said improvement further comprises said stacking pocket being attached to the roof by bolts, washers, and nuts.

* * * * *